United States Patent [19]
Bieber et al.

[11] Patent Number: 4,897,603
[45] Date of Patent: Jan. 30, 1990

[54] ARRANGEMENT FOR DETERMINING THE SPEED AND ROTOR POSITION OF AN ELECTRIC MACHINE

[75] Inventors: Joachim Bieber, Bad Neustadt; Manfred Frank, Heustreu; Wolfgang Schneider, Fulda, all of Fed. Rep. of Germany

[73] Assignee: Siemens Aktiengesellschaft, Berlin & Munich, Fed. Rep. of Germany

[21] Appl. No.: 302,828

[22] Filed: Jan. 26, 1989

[30] Foreign Application Priority Data

Feb. 29, 1988 [DE] Fed. Rep. of Germany ....... 3806438

[51] Int. Cl.$^4$ .......................... G01B 7/30; G01P 3/48
[52] U.S. Cl. .................... 324/208; 324/262; 324/174; 324/227; 324/226
[58] Field of Search .............................. 324/163–168, 324/173, 174, 207, 208, 226, 227, 260–262; 310/156; 322/28, 29, 31, DIG. 5

[56] References Cited

U.S. PATENT DOCUMENTS

| 4,364,005 | 12/1982 | Kohzai et al. | 322/31 |
| 4,551,715 | 11/1985 | Daubin | 324/174 X |
| 4,645,961 | 2/1987 | Malsky | 310/156 |
| 4,672,274 | 6/1987 | Suganuma | 318/254 |
| 4,725,777 | 2/1988 | Tousch | 324/208 |
| 4,764,767 | 8/1988 | Ichikawa et al. | 324/174 X |
| 4,779,075 | 10/1988 | Zägelein et al. | 324/208 X |

FOREIGN PATENT DOCUMENTS 0023123 1/1981 European Pat. Off. .
0193929 9/1986 European Pat. Off. .
3609218 10/1986 Fed. Rep. of Germany .

Primary Examiner—Reinhard J. Eisenzopf
Assistant Examiner—Warren S. Edmonds
Attorney, Agent, or Firm—Kenyon & Kenyon

[57] ABSTRACT

The invention provides an arrangement for determining the speed and rotor position of an electric machine, which arrangement consists of a tachometer generator having a permanent-magnet-excited rotor and a coaxially arranged rotor position transmitter which has a rotor body equipped with permanent magnets. Around the circumference of the rotor body magnetic-field sensitive sensor elements are arranged. A compact assembly of the tachometer generator and rotor position transmitter without detrimental mutual interference is possible by the provision that first permanent magnets magnetized in the tangential direction are arranged centered to the pole gaps of the tachometer generator rotor at the rotor body in such a manner that the sides of two adjacent permanent magnets facing each other have the same polarity as the magnet pole extending between the respective pole gaps of the tachometer generator rotor. Furthermore at least one second permanent magnet magnetized in the direction of an axis of rotation is arranged on the side of the rotor body adjacent to the tachometer generator rotor, centered relative to each two first permanent magnets in such a manner that its side facing the tachometer generator rotor has the opposite polarity (N or S, respectively) as the opposite magnet pole of the tachometer generator rotor.

7 Claims, 1 Drawing Sheet

ARRANGEMENT FOR DETERMINING THE SPEED AND ROTOR POSITION OF AN ELECTRIC MACHINE

BACKGROUND OF THE INVENTION a. Field of Invention

The invention relates to an arrangement for determining the speed and rotor position of an electric machine.

b. Description of the Prior Art

An arrangement for determining the speed and rotor position is known from U.S. Pat. No. 4,364,005. In this reference, in order to assemble of a tachometer generator and the rotor position transmitter in the axial direction with the greatest possible space saving without undesirable mutual interference, a magnetic shield is inserted between the two machines. This shield represents a passive load and its arrangement between the two machines requires a corresponding effort during the assembly.

OBJECTIVES AND SUMMARY OF THE INVENTION

It is an objective of the invention to achieve in an arrangement an axial assembly of the tachometer generator and the rotor position transmitter as close as possible, without the need for passive shielding elements to avoid detrimental mutual interference.

The invention provides an arrangement for determining the speed and rotor position of an electric machine, which arrangement consists of a tachometer generator having a permanent-magnet-excited rotor and a coaxially arranged rotor position transmitter which has a rotor body equipped with permanent magnets. Around the circumference of the rotor body magnetic-field sensitive sensor elements are arranged. A compact assembly of the tachometer generator and rotor position transmitter without detrimental mutual interference is possible by the provision that first permanent magnets magnetized in the tangential direction are arranged centered to the pole gaps of the tachometer generator rotor at the rotor body in such a manner that the sides of two adjacent permanent magnets facing each other have the same polarity as the magnet pole extending between the respective pole gaps of the tachometer generator rotor. Furthermore at least one second permanent magnet magnetized in the direction of an axis of rotation is arranged on the side of the rotor body adjacent to the tachometer generator rotor, centered relative to each two first permanent magnets in such a manner that its side facing the tachometer generator rotor has the opposite polarity (N or S, respectively) as the opposite magnet pole of the tachometer generator rotor.

By the described arrangement of the first and second permanent magnets at the rotor body of the rotor position transmitter, a steep slope during the change of polarity of the induction of the rotor position transmitter is achieved so that only extremely small switching point deviations sensor elements result. In addition, particularly the second permanent magnets act on the stator windings of the tachometer generator in such a manner that the ripple of the speed-proportional voltage induced in this stator winding is greatly reduced; thus, a residual ripple of about 0.5% could be achieved.

Preferably the second permanent magnets are arranged axially outside the first permanent magnets. To reduce voltage ripple the production of the invention may be advantageously achieved by embedding the first and second permanent magnets in the rotor body consisting of plastic material.

BRIEF DESCRIPTION OF THE DRAWINGS

The subject of the application will be described in greater detail in the following with the aid of the example shown in the drawing, wherein.

DETAILED DESCRIPTION OF THE INVENTION

Figure 1:
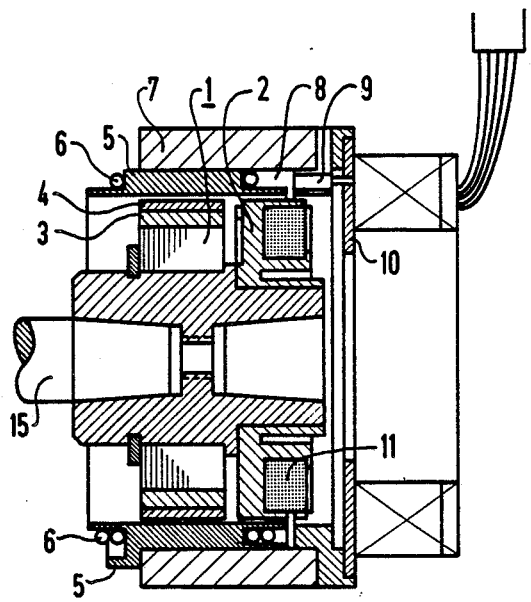
FIG. 1 shows an arrangement consisting of a tachometer generator and a rotor position transmitter in a cross section.

The rotor of the tachometer generator is designed by numeral 1 and the rotor position transmitter of the arrangement is designated by numeral 2. At the circumference of the tachometer generator rotor 1, permanent magnets 3 are provided in a six-pole arrangement. The permanent magnets 3 are cemented to the rotor 1 and/or are held by a wrapping 4 as shown. The stator winding 6 of the tachometer generator is arranged on a core 5 designed as a hollow cylinder of plastic or another suitable nonmagnetic material. The axial dimension of the individual coil 5 of the stator winding 6 is larger than the axial dimension of the permanent magnets 3. The core 5 is inserted into a return yoke 7 surrounding the tachometer generator rotor which extends in the axial direction also over the rotor body 2 of the rotor position transmitter. In the air gap 8 between the rotor body 2 and the return yoke 7, there are a plurality of Hall sensors 9 which are fastened to a support means 10 which is furthermore equipped with an electronic evaluating circuitry (not shown).

Figure 2:
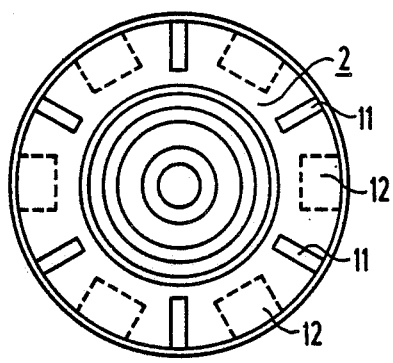
FIG. 2 shows a view of the rotor body of a rotor position transmitter.
Figure 3:
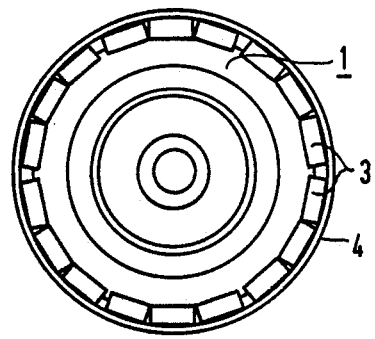
FIG. 3 shows a view of the rotor of the tachometer generator.
Figure 4:
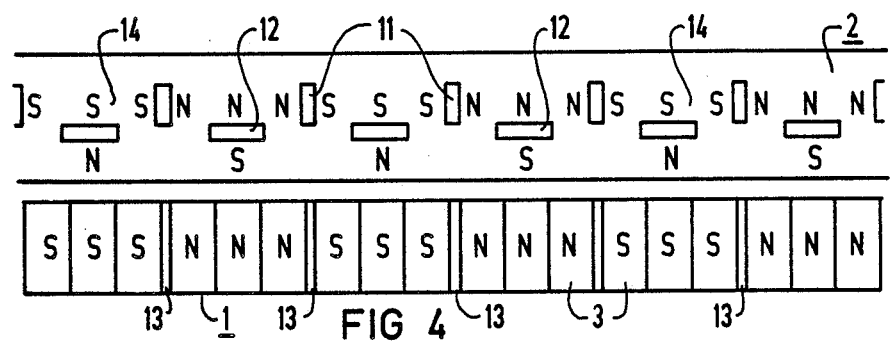
FIG. 4 shows a development of the tachometer generator rotor and the rotor body of the rotor position transmitter.

As can be seen from FIGS. 2 and 4, the rotor body 2 of the rotor position transmitter is also equipped with a plurality of first and second permanent magnets 11 and 12. The rotor body 2 is made of a plastic material and these first and second permanent magnets 11 and 12 are embedded in the plastic material. For manufacturing reasons, these permanent magnets 11 and 12 are pressed into the rotor body 2 when the latter is being formed. From the development drawing of the tachometer generator rotor 1 and the rotor body 2 in FIG. 4, particularly the polarity and the arrangement of the first and second permanent magnets 11 and 12 relative to each other and with respect to the permanent magnets 3 of the tachometer generator rotor 1 can be seen.

The first permanent magnets 11 are magnetized in the direction of the circumference of the rotor body 2, i.e., tangentially, and are centered with respect to the pole gaps 13 between magnets 3. The first permanent magnets are arranged so that the facing sides of two adjacent first permanent magnets 11 in the circumferential direction have the same polarity namely, have either a south pole S or north pole N. This polarity corresponds furthermore to the polarity of the magnet pole formed by magnets 3 of the tachometer generator rotor 1, which is disposed with axial spacing between the two respective first permanent magnets 11. i.e., if the magnet pole of the tachometer generator rotor 1 is formed as a south pole, the two first permanent magnets 11 opposite the pole gaps 13 defining this south pole are facing each other with the south poles S. Similarly, the two first permanent magnets 11 are facing each other with their north poles N if the magnet pole of the tachometer generator rotor 1 bounded by them is a north pole.

In the region between two first permanent magnets 11, a second permanent magnet 12 is arranged at the rotor body 2. Each second permanent magnet 12 is arranged so that it is located on the side of the rotor body 2 facing the tachometer generator rotor 1 axially outside the space 14 formed by two adjacent first permanent magnets 11. Two adjacent second permanent magnets 12 are arranged, centered in the circumferential direction, between two respective first permanent magnets 11 and are magnetized axially, i.e., in the direction of the axis of rotation 15. The second permanent magnets 12 are oriented so that the polarity of the side, facing the tachometer generator rotor 1, of each of the second permanent magnets 12 is opposite the polarity of the axially adjacent magnet pole of the tachometer generator rotor 1. I.e., a north pole of the tachometer generator rotor 1 is facing the south pole of the respective second permanent magnets 12 as shown. It follows from this alignment of the second permanent magnet 12 that the polarity of the side facing the space 14, of the second permanent magnets 12 correspond to that polarity which the two facing sides of the two first permanent magnets 11 bounding the respective space 14 as shown.

By this arrangement of the first and second permanent magnets 11 and 12, a small switching point deviation of the signals furnished by the Hall sensors is achieved. This is due to the fact that the induction curve caused by the permanent magnets is very steep. This steepness is further aided by the arrangement of the Hall sensors 9 in the air gap 8 between the rotor body 2 and the return yoke 7 since the magnetic flux emanating from the permanent magnets 11 and 12 of the rotor body 2 is concentrated through the return yoke 7. Furthermore, a reduction of the ripple of the voltage supplied by the tachometer generator in the described arrangement of the first and second permanent magnets 11 and 12 was found. In this arrangement, the rotor body 2 is the rotor position transmitter is moved very close to the tachometer generator rotor 1, and thereby, the overall size of the arrangement is substantially reduced.

The tolerance with respect to the axial offset between the stator winding 6 and the rotor 1 of the tachometer generator is also increased substantially without adverse effects on the tachometer voltage.

Preferably the permanent magnets 3, 11 and 12 are rare earth magnets.

What is claimed is:

1. An arrangement for determining the speed and rotor position of an electric machine comprising a tachometer generator having a permanent magnet-excited rotor, poles separated by pole gaps and a multi-phase stator winding; and a rotor position transmitter which is arranged coaxially to said tachometer generator at a preselected distance and has a rotor body equipped with first and second magnets; magnetic field-sensitive sensor elements are arranged around said rotor body with a circumferential spacing corresponding to the pole spacing, said rotor body (2) consisting of non-magnetic material, said first permanent magnets (11) being magnetized in the tangential direction at a spacing corresponding to the pole gaps (13) and being arranged centered with respect to said pole gaps (13) in such a manner that the sides of two first permanent magnets (11) facing each other have the same polarity as the magnet pole of the tachometer generator rotor (1) extending between the respective pole gaps (13); wherein at least one second permanent magnet magnetized in the direction of the axis of rotation (15) is arranged on the side of the rotor body (2) adjacent to the tachometer generator rotor (1) and centered between two first permanent magnets (11) in such a manner that its side facing the tachometer generator rotor (1) has the opposite polarity as the magnet pole of the tachometer generator rotor (1).

2. The arrangement according to claim 1, wherein said second permanent magnets (12) are arranged axially outside the first permanent magnet (11) at the rotor body (2).

3. The arrangement according to claim 1 wherein the rotor body (2) consists of plastic and the first and second permanent magnets (11 and 12) are embedded therein.

4. Arrangement according to claim 1, said magnetic field-sensitive elements comprise Hall sensors (9).

5. The arrangement according to claim 4, wherein a magnetically conductive return is associated with the Hall sensors.

6. The arrangement according to claim 5, wherein the return is formed by an extension of a return yoke (7) of the tachometer generator.

7. The arrangement according to claim 5, wherein rare earth magnets are used as the permanent magnets (3, 11, 12).

* * * * *